United States Patent [19]
Reddington

[11] Patent Number: 6,115,556
[45] Date of Patent: Sep. 5, 2000

[54] DIGITAL CAMERA BACK ACCESSORY AND METHODS OF MANUFACTURE

[76] Inventor: Terrence P. Reddington, 17 Hillcrest Rd., Canton, Mass. 02021

[21] Appl. No.: 09/056,980

[22] Filed: Apr. 8, 1998

Related U.S. Application Data

[60] Provisional application No. 60/043,227, Apr. 10, 1997.

[51] Int. Cl.[7] .................................................. G03B 17/24
[52] U.S. Cl. ........................ 396/267; 396/429; 396/544; 348/64
[58] Field of Search ............................. 348/64; 396/267, 396/429, 544

[56] References Cited

U.S. PATENT DOCUMENTS

| | | | |
|---|---|---|---|
| 4,531,818 | 7/1985 | Bally | 396/267 |
| 4,953,029 | 8/1990 | Morimoto et al. | 358/64 |
| 5,074,683 | 12/1991 | Tarn et al. | 385/120 |
| 5,134,680 | 7/1992 | Schempp | 385/116 |
| 5,303,373 | 4/1994 | Harootian, Jr. | 385/115 |
| 5,313,542 | 5/1994 | Castonguay | 385/115 |
| 5,541,656 | 7/1996 | Kare et al. | 348/334 |
| 5,550,380 | 8/1996 | Sugawara et al. | 250/370.11 |
| 5,614,763 | 3/1997 | Womack | 257/747 |
| 5,615,294 | 3/1997 | Castonguay | 385/115 |

*Primary Examiner*—David M. Gray
*Attorney, Agent, or Firm*—Hamilton, Brook, Smith & Reynolds, P.C.

[57] ABSTRACT

The invention includes a digital camera back accessory for use with a film-formatted camera of the type that includes a camera body and a film image plane. A solid state digital focal plane collects optical radiation and converts the radiation to digital signals representative of a digital image. A fiber optic taper has a first fiber array surface arranged at the camera film plane, and a second fiber array surface arranged at the digital focal plane, and provides magnification and/or demagnification between the film plane and the digital focal plane. A coupler couples the taper to the camera body such that an image at the film image plane is transferred and collected as a digital image at the digital focal plane. The focal plane can also be coupled to a computer so that camera images are collectable at the computer. Preferably, a solid state memory is included to store frames of digital image data. Since the digital camera back is an accessory, a user can attach and alternatively remove the accessory from the camera. Driver electronics can be coupled with the focal plane, and an electronics subsystem is also preferably part of the DCB for data and power control of the accessory. The DCB includes means for connecting the accessory to pre-existing data paths in the camera, wherein the accessory operates in response to user functions in the camera.

32 Claims, 7 Drawing Sheets

DIGITAL CAMERA BACK ACCESSORY AND METHODS OF MANUFACTURE

RELATED APPLICATION(S)

This application claims the benefit of a now abandoned U.S. Provisional application Ser. No. 60/043,227, filed Apr. 10, 1997, which is hereby incorporated by reference.

BACKGROUND

Solid state cameras are well known in the art. Such cameras include (a) relatively inexpensive digital cameras suitable for home use, such as with a computer, and (b) relatively expensive digital cameras suitable for professionals and which have approximately one million pixels or more.

However, professional users of classical, 35 mm film cameras (or 80 mm or other classical film formats) cannot ready utilize their existing personal cameras with solid state focal planes. Typically, these professional users purchase a second, high quality digital camera as an alternative to their classical camera.

In the prior art, there has been some attempt to utilize a lens train to optically translate the film plane onto a digital focal plane through magnification or demagnification. However, this technique results in a bulky and unwieldy camera. This technique also inefficiently transfers optical energy between the film plane and the focal plane because of aspect-ratio differences. That is, for example, the 35 mm film format has a horizontal-to-vertical ratio of 3:2; while the digital focal plane format has a horizontal-to-vertical aspect ratio of 4:3. Accordingly, the optical conversion between these planes is not 1:1 in both axes. Typically, therefore, the prior art techniques only relay a portion of the image at the film plane.

Another problem with prior art techniques concerns optical correction. It is not, generally, a simple matter to relay an image to another plane without concern for optical correction. Rather, the whole optical path and aberration characteristics must be considered. In addition, the relay lenses should generally be of the same quality as the camera lenses. These factors, in combination with above difficulties, make the prior art technique expensive and impractical.

It is, accordingly, an object of the invention to provide apparatus that solves or reduces the above-described problems in the prior art.

Another object of the invention is to provide a digital camera back accessory that replaces the standard camera back so as to convert a standard film plane image to a digital image while capturing and relaying the entire film plane image to the digital focal plane.

A further object of the invention is to provide a method of converting a classical film-formatted camera to a digital camera.

Yet another object of the invention is to provide a process of manufacturing digital camera backs as an accessory to classical camera backs, whereby the digital camera back generates a digital image of the film-formatted image plane.

Still another object of the invention is to provide apparatus for converting high quality film-formatted cameras to digital cameras without loss of optical energy and quality.

These and other objects will become apparent in the description which follows.

SUMMARY OF THE INVENTION

In one aspect, the invention is a camera back accessory (referred to herein as the Digital Camera Back, or "DCB") that replaces the existing camera back on a classical, film-formatted camera (i.e., a "35 mm camera") of the type that includes a camera body and a film image plane. The DCB includes (a) a solid state digital focal plane, (b) a fiber optic taper that has a first fiber array surface constructed and arranged at the camera film plane, and a second fiber array surface constructed and arranged at the digital focal plane (sometimes denoted herein as "focal plane array" or "FPA") the taper being tapered so as to provide magnification and/or demagnification between the film plane and the digital focal plane, and (c) a coupler for coupling the taper to the camera body such that an image at the film image plane is transferred and collected as an image at the digital focal plane.

In another aspect, an adhesive is used to couple the focal plane to the second array surface.

In another aspect, the DCB includes driver electronics to control and interface with the focal plane. In still another aspect, the DCB includes a PC interface for connecting the DCB to a computer. In yet another aspect, the DCB includes a microprocessor (and/or a digital signal processor "DSP" microchip) for processing selected features of the digital image and/or for processing data to and from the focal plane. In another aspect, the DCB includes digital memory (e.g., RAM) so that one or more digital pictures can be stored within the DCB. In a related aspect, the DCB preferably includes means for transferring data out of the DCB.

In a preferred aspect of the invention, the DCB is attached to the camera body with a user-operated fixture that permits selective attachment or removal of the DCB from the camera. In this way, the user has the option of using the camera in either a digital mode or a film mode by utilizing the DCB or the standard camera back, respectively. As such, the DCB is an accessory to the standard film-formatted camera.

In the preferred aspect of the invention, the fiber optic taper provides a full 1:1 imaging of the entire image generated by the 35 mm camera at the film image plane, thus capturing the camera's total field of view onto the digital focal plane.

In still another aspect, the DCB operates as a "slave" to the camera's standard operating speed and f-number. By way of example, the DCB preferably includes a user-operated switch (or compatibility with an existing camera switch or button) to select ASA equivalent film settings. Alternatively, if the camera is electronic-based, so as to include a microprocessor or microcontroller, then the DCB couples to the camera, electrically and datawise, and adjusts selected parameters so as to be compatible with the user-selected settings on the camera. In addition, the DCB preferably utilizes the power from the existing battery of the camera, thereby reducing size and weight.

In yet another aspect, the invention provides an electronic DCB accessory device which attaches to the body of a film based camera (35 mm, 80 mm or other focal length camera) and which replaces the film and film plane with a fiber-optic image relay taper connected to a focal plane array (and support electronics). Preferably, the DCB accessory captures the full 35 mm image (or other focal length image) and transfers the image to an electronic camera for digital frame acquisition and storage.

One camera attachment known in the art is set forth in U.S. Pat. No. 4,348,086 by M. Forscher, the patent being incorporated herein by reference. The attachment of the '086 patent concerns the acquisition of instant film photographs through replacement of a camera back with a fiber optic faceplate and contact print film. In one aspect of the invention, therefore, the DCB is replaceable with either (a) the camera's normal film-based back and (b) an instant film accessory such as set forth in the '086 patent. With the DCB, a user can thus 1) record pictures with the camera's normal film-based back for classical film photography, or 2) replace the film-based back with instant film for recording of proofing pictures, or 3) utilize the DCB and display electronic pictures using a digital storage medium and display devices such as a computer.

In other aspects, the DCB includes a fiber optic taper connected to a digital focal plane array with driver electronics. The electronics can include (a) analog and/or digital circuitry, (b) one or more microcontrollers and/or microprocessors, (c) digital memory (or other storage devices known in the art), (d) display devices, and/or (e) an interface to a remote computer via serial, parallel, wireless or other bus transfer. A housing for the DCB is preferably configured to mechanically attach to the film camera body such as through a hinge or latch (and other mechanisms known in the art).

In one aspect, the DCB utilizes a fiber optic taper in direct contact with the film rails of the camera body to provide 1:1 imaging from the full complement of camera lens objectives that are attachable to the body. Accordingly, image transfer by the DCB of this aspect covers the total field of view of the camera objective. A photographer utilizing the DCB thus can operate with the fill complement of lens types and accessories normally available for the camera, and yet have the added flexibility and convenience of digital image capture, storage and electronic image manipulation (real-time or off-line through subsequent frame review from memory storage) as provided by various aspects of the DCB.

In a preferred aspect, the fiber optic taper connected with the DCB accommodates all lens speeds from the highest speed (less f/1) to very large, slow speed f-numbers such as in the case of telephoto lenses.

In still another aspect, the fiber optic taper of the DCB efficiently collects and transfers light through the camera lens system to the FPA without loss of f-stop. Further, the fiber optic taper of the invention can increase the effective film speed of the FPA camera by transferring the normal 35 mm (or other focal length) film formatted image onto the much smaller active area of the FPA. By way of example, a DCB taper which transfers a 35 mm film plane image (36.3 mm by 24.2 mm) onto a 3:2 FPA (9.72 mm by 6.48 mm) requires a demagnification of 3.73 to 1; and further increases the light intensity by greater than a 6 factor (this is true even with coupling inefficiencies of up to 43% such as through cladding throughput losses).

In yet another aspect, the DCB fiber optic taper is constructed and arranged with a high numerical aperture (NA), for example NA equal to 1.0, or with a lower numerical aperture, for example NA of 0.6. The high NA taper accommodates substantially all camera objective types, including even high speed objectives; and tapers with a lower NA are desirable for improvement or selectivity of the camera to a narrower field of view or for specific artistic effects desired by the photographer.

The fiber optic tapers of the invention preferably transmit either visible light. However, those skilled in the art should appreciate that infrared and UV cameras are now becoming popular, and thus the tapers of the invention can also be constructed to transmit infrared or UV light.

The DCB fiber optic in another aspect incorporates extra mural absorption (EMA) materials for contrast enhancement. The fiber optic taper can also have spectral selective transmissive features such as color enhancement using a color temperature or blue preferential transmissive material.

The fiber optic tapers of the invention can also include a wavelength-specific optical thin film filter coating on the input surface such as a band pass filter or heat blocking filter. Specifically, the broad spectral response of the FPA device may necessitate coating of the fiber optic with a blocking and/or band pass filter to avoid image blooming or wash out. In an alternative aspect to provide the same effect, an external filter is optically coupled with the camera lens objective (byway of example, an external, flat surface glass filter, known in the art, can be used at the camera's entrance aperture).

The fiber optic tapers of the invention can be made of a glass, composite material, polymers, or mixtures thereof.

In still other aspects, the fiber array is constructed and arranged in different configurations, including: hexagonal closed pack, square packed, or a geometric design which reduces fixed pattern noises in the DCB or which enhances the Modulation Transfer Function "MTF". The nominal fiber pitch within the DCB tapers is typically smaller than that of the FPA pixel spacing so as to provide sufficient sampling for image transfer reliability and resolution. One preferred fiber construction utilizes an array geometry which does not match the pitch and geometry of the pixel array construction of the FPA, to eliminate or reduce fixed pattern noises that can otherwise degrade the performance of digital cameras.

In yet another aspect, the DCB is slave to user specified settings for photograph composition through the film camera body. Preferably, the DCB acquires the full image (without vignetting) at the camera's image plane, and the DCB has film-equivalent ASA speed settings and/or programmable selections of film speed settings which the photographer inputs to the camera body. Data to the DCB can derive electronically from a tethered computer or via a switch setting on the DCB.

For ergonomic reasons, the DCB does not generally interfere with the photographer's use of a camera eyepiece and view finder for normal through-the-lens viewing and focusing.

The DCB of the invention supports operation with the normal camera flash and other external lighting accessories in the mode to which the photographer is accustomed. The DCB can be slaved to user-activated selections at the camera body so as to facilitate user control of desired lighting conditions.

In another aspect, the DCB obtain electrical power from the camera body, the camera's auxiliary power pack, or from an internal power pack to the DCB body. This power connection comes from methods known in the art, such as through pin connections between the camera and the DCB at the camera's back. For example, the DCB typically operates on 6 V DC from the camera power pack.

In still another aspect, the DCB operates from an external synchronization trigger pulse from the camera body. The external synchronization provides timing for the 'start of scan' pulse triggered to the FPA frame time. The trigger can be, for example, a flash trigger or a shutter-open picture-taking action. Alternatively, the synchronization pulse derives from an auxiliary strobe output synch pulse from the camera body via operator input key selection on the camera body or by another sensor (for example, by sensing the power droop from the power pack; or a photodetector mounted as a part of the DCB senses light from the opening of the camera shutter mechanism).

Typical FPAs correspond to the 4:3 aspect ratio of a computer monitor such as a VGA or XVGA format. However, in one aspect, the DCB FPA is sized to record a picture frame in a 3:2 or other standard film aspect ratio. The fiber optic taper of this aspect transfers images to that portion of the FPA that represents the highest resolution of pixels in the film format. For example, for a one million pixel, 4:3 aspect, 9.72 mm×7.30 mm active area CCD, the DCB of this aspect uses only 9.72 mm horizontal by 6.48 mm vertical active area of the CCD for the image transfer. Therefore, about 90% of the typical computer monitor screen is filled with the 35 mm format image. This leaves several rows of non-image space in the display for alphanumeric or other data. For example, the extra space can be written to from a keyboard connected with the DCB (e.g., through an interface with a computer) to annotate the file.

Those skilled in the art should appreciate that the non-image file space in the digital file of the frame can also incorporate audio, graphics or other information associated with the picture.

The DCB of another aspect includes camera electronic programming features to allow for single frame acquisition, multiple frame per second (usually no more than 3 frames per second), or high speed motion video frame capture.

The DCB of another aspect incorporates removable RAM memory or disk drive assembly for extension of on-board fame storage.

The DCB of another aspect connects to, or includes, an auxiliary display such as a LCD flat panel display for real-time, live video viewing or for later preview of frames stored in the DCB memory.

The DCB of another aspect incorporates, or interlaces with, a microphone or other recorder to record live audio within memory (and tagged to a particular frame, if desired) or to annotate frames within storage.

In still another aspect, a process is provided to assemble the DCB fiber optic taper to the FPA, including the step of bonding the FPA by an adhesive while registering the FPA to the taper with a fixture. In this aspect, the fiber optic is placed in an assembly fixture that utilizes the same mounting plate and mechanical fixture that registers the fiber optic to the film plane rails of the camera body. The FPA is assembled to a precision mechanical stage that provides for fixing the FRA active area in x-, y-axis and rotation to the small end of the taper imaging area The small end of the taper imaging area is machined to be identical in dimension to the FPA active area representing, for example, the 3:2 aspect of a 35 mm format image. An adhesive bond agent or coupling cement, oil or gel is applied to the FPA and the fiber optic taper is mechanically moved into contact with the FPA active area (such as through screw adjustment) until the image plane of the fiber optic and the FPA are in intimate contact. Final position adjustments are made with precision motion actuators. Once alignment is established, the fiber optic to FPA subassembly is fixed in place such as by curing of the adhesive.

In another aspect, the FPA and supporting electronics are fixed to the fiber optic taper. The fiber taper is placed in mechanical alignment to the film plane of the camera body and a pressure plate using spring force (or other soft mechanical fixation) seats the fiber optic to the camera body. The FPA and electronics are then "floating" relative to the DCB housing, assuring maximum reliability, durability and resistance of the DCB to shock or abuse. The FPA and its electronics board are then tethered to a back end driver and a digital electronics plus memory storage and computer interface via a flexible wiring harness.

In yet another aspect, the fiber optic taper is mechanically affixed to the film rails of the camera body by a pressure plate mechanism. The pressure plate mechanism gently mounts to the fiber optic on flat sides machined on the fiber optic and presses the fiber optic with spring force (i.e,. by using a spring, elastomer, bladder or other contact mechanism) which establishes an optically flat contact of the image plane of the fiber optic taper with the film plane of the camera.

The DCB of the invention preferably uses a common fiber optic taper and FPA (and supporting electronics) for all film camera types and bodies of a common format (e.g., 35 mm). Differences in the placement of the optical z-axis position of the taper for different camera manufacturers or models are compensated for by adjusting the mechanical placement of the pressure plate mechanism in the DCB. Therefore, a standard internal optical front end is achieved for many different camera styles.

In yet another aspect, the outer housing of the DCB is custom-molded or machined to match the appearance, color and feel of the camera body, as well as to fit the ergonomic features and handling of the original camera manufacturers' design.

The DCB is thus suitable for use with 35 mm, 80 mm and other film based cameras. The DCB attaches to the camera body and converts the film-based camera image into a solid state electronic or digital image (or "frame"). The DCB thus provides the professional or amateur photographer with ability to use the existing camera with its existing complement of lenses, filters, auxiliary lighting, focusing optics, viewers and standard and auxiliary features common to the camera, but with storage in a digital computer image file. The photographer therefore maintains all pre-existing camera options of recording still, stop action or motion images all with the same camera body and objective lenses by exchanging the existing camera back to the DCB (and, thereby, acquiring digital images). Accordingly, the photographer need not purchase a single purpose digital camera with different or restricted complement of lenses and accessories at considerable cost and without full imaging or frame capture compatibility to a film camera. The DCB acts interchangeably with the preexisting film-based camera back; and the photographer can switch between the two as desired.

In another aspect, the DCB employs a fiber optic taper or array of multiple tapers to transfer and condense the image plane of the film camera to one or more FPAs and support electronics. The high numerical aperture fiber optic taper of the DCB provides for full frame transfer of the 35 mm (or other film plane format) image onto the FPA device without loss, cropping or telescoping of the image and with acceptance of the full image field of view from all types and speeds of camera objectives. The fiber optic array registers to the film rail of the camera body plus the aperture for film exposure and demagnifies the image onto a FPA format such as 3:2. The photographer thus obtains an image that has similar (or identical) field attributes as that of the film or instant film medium.

In still another aspect, the DCB utilizes an alignment mechanism to position the fiber optic taper onto the film rails of the camera body with great precision and without distortion or mechanical damage to the camera body or to the fiber optic. The fiber optic can include an optical coating on the first surface to correct color and/or to shield the FPA device from radiation outside of the visible spectrum (such as in the ultraviolet and/or infrared) that might otherwise degrade the electronic image. The fiber optic taper can be made from glass or polymer, and can include contrast-enhancing features, fixed pattern noise reduction, and color correction material.

The FPA of one aspect is adhesive bonded or otherwise affixed to the fiber optic taper. The fiber optic to FPA registration aligns the FPA and the taper to the 35 mm film format with at least 98 percent efficiency.

In yet another aspect, the DCB connects to the camera body using hinge and latch mechanisms similar to that for the standard film back. The DCB package normally fits within the height and width dimension of the camera body with compatible styling, material and color. The DCB should not impede the use of the camera view finder which the photographer may continue to employ.

The DCB of another aspect connects to the camera body's existing power pack or extended power pack system. The DCB can also be slave to the timing of the existing camera shutter assembly, exposure and flash or other auxiliary attachments. Accordingly, the photographer retains the functional features and flexibility of the pre-existing camera.

The DCB of another aspect provides the user with auto-focus, auto-exposure, auto-framing and multiple frame per second features. For example, many professional-quality film cameras provide options for programing of three frames per second with fractional stop, focus or other shifts in order to capture the best picture. The DCB, accordingly, preferably supports multiple frame program modes with a sufficient digital image storage.

The DCB of other aspects includes a fiber optic taper, a FPA, a front end driver, image conversion electronics, back end control and digital file management electronics, digital frame storage medium, and/or a data transfer subsystem to a remote computer. Typically, the front end electronics is used to remove a captured image from the FPA and to convert into a digital format.

The FPA of the invention can include a two-dimensional color or black and white CCD, CID, CMOS or other opto-electronic device which converts an optical image into a digital format.

Typical back end electronics of the invention include device control mechanisms, input/output (I/O) with the digital storage medium, and computer and camera body interfaces. The back end electronics of one aspect provides a temporary buffer memory storage for digital images, and an interface with on-board storage for communication to a remote computer.

In a preferred aspect, the DCB includes an electronic display (or an interface to such a display) for 'proofing' of electronic images or for later review of stored digital images. This aspect thus enables timely file management and expands the photographer's decision making process.

The DCB of the invention thus preferably retains the valuable features of the film-based camera body and accessories with a fidelity that a photographer normally employs, but extends the flexibility of the camera to that of digital image collection and electronic compensation.

Preferably, the DCB operates with the Polaroid PDC2000® focal plane, though the DCB can operate with other digital focal planes available in the art.

In another aspect, the invention includes a low pass, anti-aliasing filter in the optical path to the FPA. The mathematical convolution of the fiber array taper cascaded with the FPA tends to mitigate the fixed pattern noise of the FPA. Further enhancements can be made with color filters and other spatial and color filters. In one aspect, a birefringent filter such as a plate of calcite crystal in the optical path before the FPA is used for the anti-aliasing filter. The bireflingent filter separates FPA-incident light into ordinary and extraordinary polarization components. The crystal axis of symmetry is chosen so as to transmit the image with the greatest difference in index of refraction for the ordinary and extraordinary components. The shift in refraction over the design thickness of the polarizing filter results in a superposition of one image with two or more adjacent discrete photosensitive sections of the FPA. A minimum shift equivalent to at least one pixel spacing is necessary. Since the FPA can include a mosaic or regular array of color filters in front of the photosensitive area, more than one color pixel should be illuminated by the same point in object space to ensure the fidelity of the digital image color reconstruction.

For example, suppose a green area of object space is incident upon a red filtered pixel of the FPA. Without any component of red in the color space of the object, the red filtered pixel records no light image and is a dark spot. However the anti-aliasing filter transmits and refracts the point in object space so that both the red pixel and an adjacent green pixel are simultaneously illuminated. The image reconstruction of the point in object space is recorded in digital image space as green. However, because the object point is spread over at least two pixels in the FPA, the spatial resolution of the digital camera is reduced. In other words, the anti-aliasing filter of this aspect also functions as a low pass filter in terms of spatial frequency resolution.

The fiber array optic in another aspect has a real image plane at its surface with very little depth of focus. Calcite crystals and most other natural birefringent crystals have relatively low refracting power, and thus very thick crystal plates are required to produce image separation that is more than one pixel spacing. The shift in position of the plane of the fiber optic relative to the film rails of the camera body may be too great to allow for a birefringent crystal anti-aliasing filter to be placed between the camera lens and the fiber optic.

In still another aspect of the invention, the fiber size and geometrical orientation of the fibers in the fiber array optic can be large so as to cover more than one pixel area of the FPA. If the fiber size is larger than the FPA pixel size then the fiber optic becomes the limiting element for spatial resolution (assuming high quality optics and electronics). However, if the fiber size is smaller than a single pixel, but the geometrical tiling is such that optical fibers straddle at least two pixels and color filter tiles, then the convolution of the fiber array optic with the FPA reduces the color aliasing problem.

In another aspect, a thin film anti-aliasing filter is applied to the front surface of the fiber array optic. The film is thin enough so that if the fiber optic is in contact print with the film rails of the camera, the axial shift in the image plane will be within the design depth of focus tolerance for the fiber optic. The filter is constructed and arranged to split or divide each point in object space among two or more FPA pixels (or at least among two or more fibers) such that at least one of two adjacent fibers transmits the object point onto a separate color mosaic pixel of the FPA The fiber size can be slightly smaller than the minimum pixel dimension, greater than the minimum pixel dimension or very much smaller than the FPA pixel size for highest frequency resolution.

The thin film anti-aliasing filter of the invention can be three dimensional for two-dimensional color mosaic array FPAs or two dimensional for FPAs with vertical color stripes In another aspect, the thin film filter is applied as a photosensitive material directly onto the fiber optic surface for lithographic processing into a photorefractive or diffractive beam splitter. In another aspect, the filter is applied to a thin polymer, crystalline or glass substrate for subsequent attachment by bonding or method to the surface of the fiber optic. In yet another aspect, the filter is made through an optical replication technique such as known in the art in fabrication of surface holograms or gratings.

In another aspect, the thin film filter is a linear transmission grating type or holographic grating in one or two dimensions In another aspect, the thin film filter is a transmission holographic type of multilayers of varying refractive index and power.

In still another aspect, the filter is a fresnel lens or an array of microprisms.

Color dispersion of the thin film filter, according to another aspect, can coincide with the color arrangement of the FPA filter mosaic. For example, periodic vertical color filter stripes of blue-green-red or cyan-yellow-magenta can be applied to the FPA surface to exploit diffractive color dispersions in the thin film filter on the top surface of the fiber optic.

In still another aspect, the thin film filter includes a liquid crystal or other chiral polymer crystal for color dispersion and/or polarization splitting of the object point onto two or more pixels or fibers. Further, the filter can be electronically activated and controlled such as with pneumatic liquid crystal or electro-chromic material.

In still another aspect, diffractive thin film filters are used to separate the object point into both positive and negative orders for maximum effect in color reproduction. For example, a 33% splitting of image space into center, left and right adjacent pixels improves color coverage over the complete spectrum.

The thin film filter of another aspect incorporates other wavelength pass band or rejection features such as infrared blocking, wavelength color balancing, dispersion efficiency, and anti-reflection.

The thin film filter of another aspect is applied or etched into a color balancing and/or infrared light blocking type substrate such as a heat absorbing glass or polymer or a light balancing glass or polymer. The substrate is applied to the fiber optic after processing into the dual purpose anti-aliasing filter.

The thin film filter of another aspect is applied to the top surface of the fiber optic to fit between the film rails and before the camera film plane (i.e., after the camera shutter). This placement helps minimize the shift in the camera film plane relative to the focal plane of the fiber optic.

In still another aspect, individual fibers of the fiber optic are color selective or have a discrete color filter for each fiber on the surface of the fiber optic. By way of example, such color selection can be constructed from photo-sensitive curing or by selective illumination through a spatial filter after application of dye-based photosensitive material to the opposite side of the fiber optic.

In addition to thin and thick film based anti-aliasing filters applied to the input fiber optic surface to remove, mask or convolve the color and spatial fixed pattern noise of the DCB, other aspects of the invention include a shift lens positioned before the image plane of the camera and the fiber optic image and/or a low pass filter at the output face of the fiber optic between the fiber optic and the FPA.

The fiber array optic has a real image plane at the output surface with very finite depth of focus. Therefore, in order to enhance color and spatial image fidelity of the DCB, the following aspects of the invention are included.

In one aspect, a thin film anti-aliasing filter is applied to the output surface of the fiber array optic. The film must be thin enough so that if the fiber optic is in contact print with the FPA device so that the axial shift in the image plane is within the acceptable depth of focus tolerance for the fiber optic to maintain a high spatial and color resolution image. The thin film anti-aliasing filter should split or divide each point in object space among two or more FPA pixels such that at least one of two adjacent fibers transmits the object point onto a separate color mosaic pixel of the FPA.

In another aspect, the thin film anti-aliasing filter is three dimensional for a two-dimensional color mosaic array FPA or two dimensional for a FPA with vertical color stripes.

The filter of another aspect is integral to the fiber optic or integral to the FPA. Such a system is thus easily assembled by adhesive or otherwise bonding the fiber optic to the FPA.

Because the fiber optic or fiber optic taper output has a very small depth of focus equal to a single or several fiber diameters, low pass filtering, anti-aliasing or spreading of the image over two or more adjacent FPA pixels is accomplished, in one aspect, by a defocus of the fiber optic from the FPA. Precise control the this defocus is required, and can thus include setting the adhesive bond gap by glass bead or other shim on the edge of the active area or field of few of the device or other mechanical shimming device. A step or edge can be constructed on the fiber optic as an alternative means of controlling the gap between the fiber optic and the FPA. Such an edge can also be built with the FPA.

In another aspect, certain DCBs use large area FPAs that match the film plane format (e.g. 35 mm, 6 cm×6 cm, or other); and a straight fiber optic can be used to provide image enhancement by convolution of the fiber optic with the large size FPA pixels.

Color aliasing and fixed pattern noise effects are also typical of large FPA devices. Accordingly, the invention preferably uses an integral anti-aliasing filter on the input or output face of the fiber optic to solve (or limit) the noise effects.

Those skilled in the art should appreciate that many of the aspect discussed herein also apply to a 1:1 fiber optic trasmission relay (i.e., without a taper), which are much less expensive than tapered arrays. In the preferred aspect of the invention, though, the DCB includes a Tapered Fiber Optic Bundle (TFOB). Such a bundle has sufficient mass and thus must be carefully coupled to the camera film plane.

The invention thus includes a method of maintaining the TFOP in contact with the film plane of the camera when the back door of the camera is latched in its closed position. The method thus ensures that the floating mount containing the TFOP remains in intimate contact with the rails of the film plane regardless of the camera orientation with the horizon. This method balances the position of the TFOP with a rectangular mount secured to the TFOP and a series of coil springs bearing against the inside of the camera back door. These springs are controlled in their action by an axial screw through the rectangular mount, through the springs, through the camera back door but not attached to it, and then secured to a thin aluminum plate which is free to move with the spring loaded mechanism. Once applied, the TFOP is in intimate contact with the rails of the camera film plane without tilting or shifting. In latching the camera door, since there is only one point of the TFOP that comes in contact with the film plane rails, the system is self-leveling. The TFOP is thus held in its correct position regardless of the orientation of the camera to the horizon.

In another aspect, the invention includes a method for compensating for aliasing in the electronic image of the FPA by bonding a transparent, thin quartz wafer to the output end of the fiber optic taper and then bonding the combined optic to the active imaging surface of the FPA.

The invention also includes a method for compensating for image aliasing and simultaneous color correction or balancing by attachment of a color balancing filter with a diffractive beam splitter to the front surface of the fiber optic taper in contact with the camera film rails.

In another aspect, the DCB includes a connection to the camera body power source and electronic synchronization with the shutter and flash attachment such that the DCB is controlled and slaved to the camera body. The camera body thereby establishes the film setting, focus, f-stop, speed and shutter actuation for the DCB accessory such that the accessory is an extension of the camera and does not require the user to change his/her way of setting and operating the camera.

In another aspect, the invention includes means for attaching and alternatively removing the DCB accessory from the camera by a hinge and/or other attachment In still another aspect, the DCB includes connectivity to a computer so that images are collectable (stored and manipulated) by the computer.

In another aspect, the DCB accessory couples the focal plane of the camera to a computer so that the camera images are delivered to the computer in a print ready condition without the need for otherwise converting, or modifying the image or digital file prior to printing a hard copy.

The DCB accessory in another aspect comprises a solid state memory for storing frames of image data The memory can be solid state, RAM, a ROM, DRAM, a hard disc, or removable storage medium.

In another aspect, the DCB includes a fiber taper with an anti-aliasing filter which improves the effective film speed of the camera.

In still another aspect, the DCB includes controls to electronically increase or decrease f-stop, shutter speed, effective film speed, and other factors, selectively.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE DRAWINGS

Figure 1:
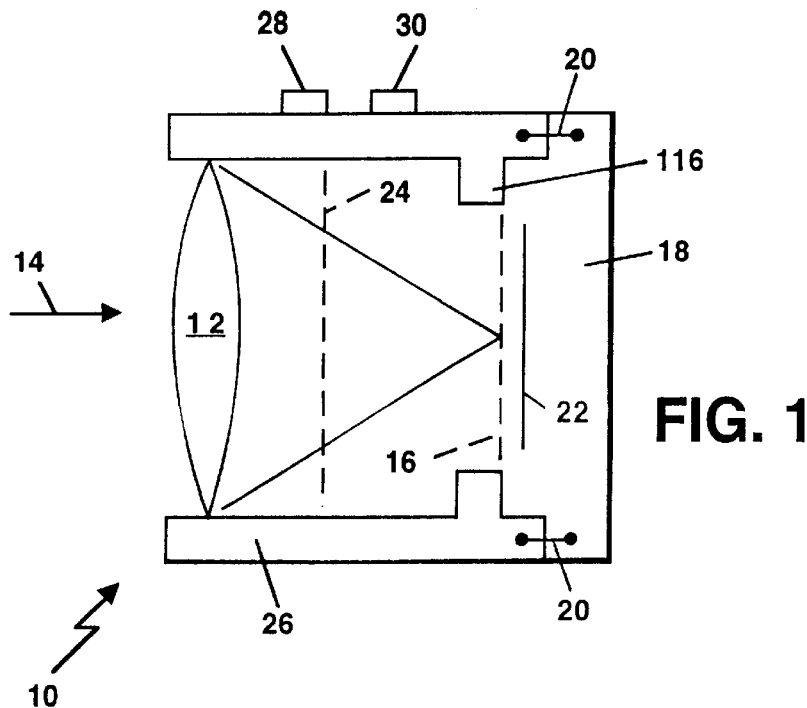
FIG. 1 illustrates a prior art 35 mm camera and camera back.

FIG. 1 shows a prior art 35 mm camera 10, including a lenses 12 (shown illustratively as a single lens) which focus incoming light 14 to a film image plane 16. The camera 10 also includes a camera back 18 which opens and closes via hinges 20 (or other mechanism) so that users can load and unload film 22 for recording at the image plane 16. A shutter—known in the art and shown illustratively as a dotted line 24—operates to shield light from the film 22 until the user takes a picture. A housing 26 integrates the camera 10 and film 22 into integrated unit.

A user typically takes pictures with the camera 10 by pressing a button, illustratively shown as button 28. Other settings are also present on the camera 10, typically, such as f-stop and ASA film speed. Generally, such settings are initiated by user control of one or more buttons and knobs, illustratively shown as button 30.

Figure 1A:
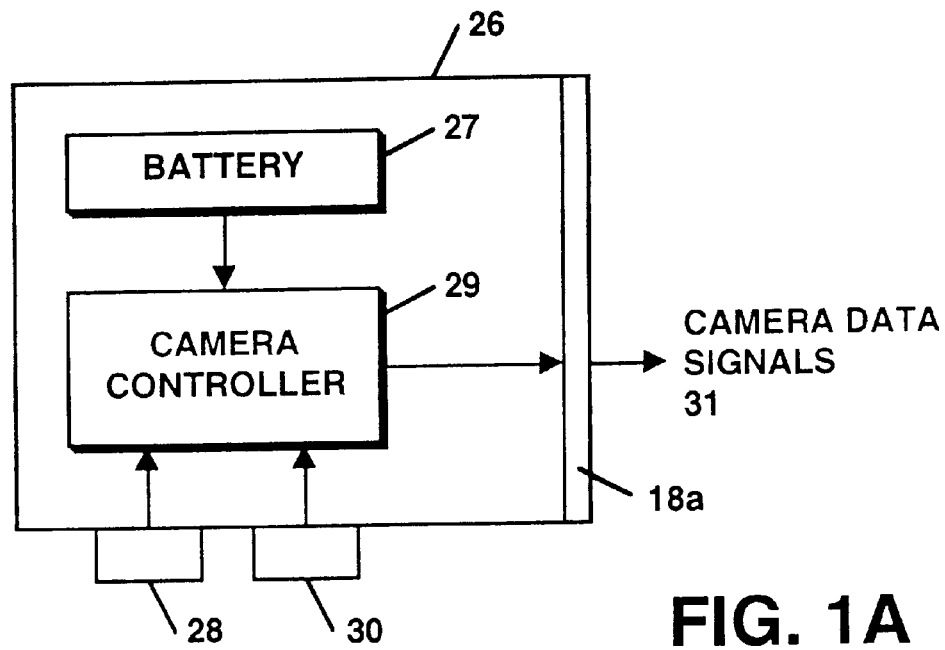
FIG. 1A illustrates certain prior art electronic capabilities of the camera of FIG. 1.

Those skilled in the art should appreciate that the camera 10 can and preferably does include batteries and supporting electronics that provide power, electro-mechanical function (e.g., shutter operation) and data signals for the camera 10. FIG. 1A illustrates typical electronic functionality of the camera 10 that is housed within the housing 26. Briefly, camera controller 29 provides overall control of the camera 10 and responds to user-initiated actions from the buttons 28, 30. A battery 27 provides overall power to the camera controller 29; and camera signals 31 (e.g., an initialization signal representing a user-initiated command to take a picture) are provided at the camera back 18 and specifically at an interface 18a with the back 18. Such signals are generally available through pin connections (e.g., a "pogo pin") and the like within the interface 18a and known in the art.

Figure 2:
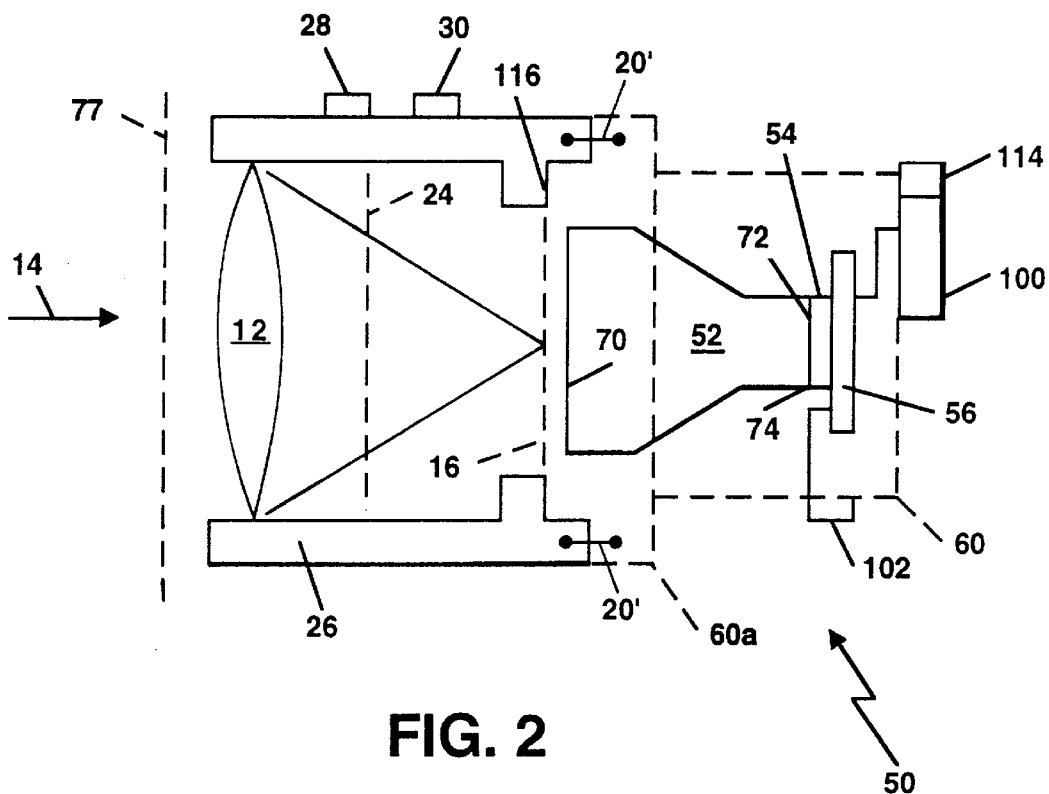
FIG. 2 illustrates a schematic side view of a DCB constructed according to the invention and connected to the objective and camera body of the camera of FIG. 1.

FIG. 2 illustrates a Digital Camera Back ("DCB") 50 that operates as an accessory to the standard, film-formatted camera such as the 35 mm camera 10, FIG. 1. In particular, the DCB 50 is made to replace the standard back 18 of camera 10 so that a user can attach either back 18 or 50 to and from the camera selectively.

The DCB 50 further includes a fiber optic taper 52, a digital focal plane array 54 (i.e., a "FPA", such as the focal plane used in Polaroid's PDC2000®), an electronics subsystem 56, and a housing 60. The housing 60 preferably includes an interface coupler 60a that includes a modified version of the camera door in the camera back 18; and the coupler 60*a* preferably uses existing hinges 20 or modified hinges 20' so as to maintain near-standard user compatibility. The coupler 60*a* is discussed in more detail below. The coupler 60*a* and/or the taper 52 align with the film rail 116 to assure alignment with the image plane 16. The coupler 60*a* may be a compliant plate that couples the fiber optic taper 52 through a hole in the door 50. The coupler 60*a* acts as a pressure plate mechanism gently mounted to the fiber optic 52 on flat sides machined on the fiber optic 52 and presses the fiber optic 52 with spring force which establishes an optically flat content of the image plane of the fiber optic taper with the film plane of the camera. A spring, elastomer, bladder, or other contact mechanism may be used as the compliant mechanism.

Briefly, once the DCB 50 is attached to the camera housing 26, the front face 70 of the optic taper 52 collects the image at the normal film plane 16 and relays that image through the fiber taper 52 and to the FPA 54. The FPA 54 is preferably coupled to a second face 72 of the taper 52 by way of an optical adhesive 74.

Figure 2A:
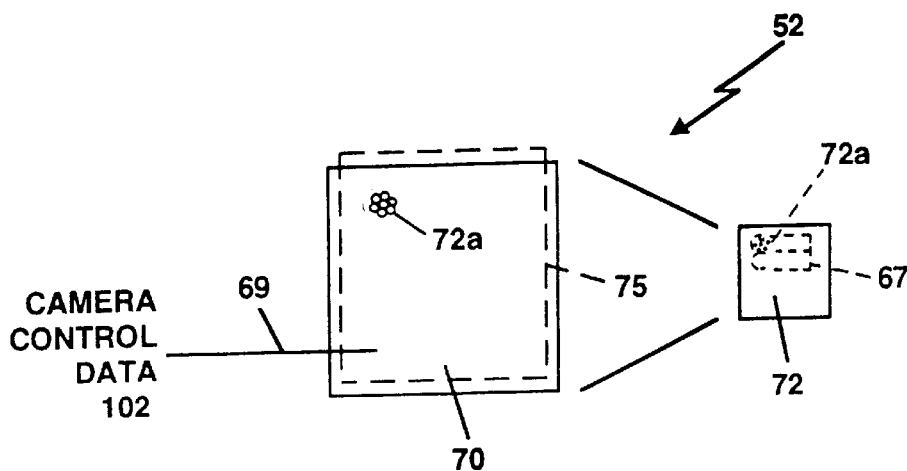
FIG. 2A illustrates demagnification by a fiber optic taper of the invention, and the selective addition of filtering on the front and/or back faces of the tapered optic.

FIG. 2A illustratively shows the demagnification between the front face 70 of the fiber optic and the second face 72 (that is adhered to the FPA 54). If desired, the front face 70 can include one or more optical coatings 75 which can, for example, provide selective wavelength filtering for a desired spectrum (e.g., transmitting only the spectrum of interest to the FPA 54).

Such thin film coatings are known in the art and beneficially reduce unwanted radiation incident on the FPA 54. The thin film layer 75 can also function as a "heat blocking" filter. Alternatively, a similar, stand-alone filter 77 can be added to the front of camera optics 12 (see FIG. 2) so as to acquire the same effect. Filters which interface with cameras are known; and the filter 77 is very similar to such filters except for its bandpass being matched to the FPA 54 spectral responsivity.

Those skilled in the art should appreciate that the filter 75 can also include a photosensitive material which provides diffractive or photorefractive beam splitting to the incident beam. The filter 75 can further include one or more of: holographic one- or two-dimensional gratings, holograms with multilayers of varying refractive power, Fresnel lenses, and an array of microprisms. The filter 75 can further include an active matrix such as an LCD that is activated through commands in the DCB 50 (e.g., such as through data generated by button 102). An electronic attachment 69 to the filter 70 is illustrated for this purpose.

Note also that one or more filters (anti-aliasing, color, spectrum blocking) can also be applied to the back face 72 of the fiber optic 52. For example, a discrete color filter 67 applied to all fibers 72*a* of the optic 52, or applied to only a portion of the face 72, as illustrated in FIG. 2A, can be used beneficially for selective filtering.

Note that the fiber optic 52 provides an optical "gain" to the light 14 imaged through the DCB 50. A 16:1 taper pull results in a 3.73:1 magnification; so a 16:1 taper provides about 3–4x gain. This decreases the shutter-open equivalent time required for an effective film speed; and can vary CCD integration relative to "shutter open" as discussed with respect to FIG. 4. The fiber optic 52 decreases the minimum acceptable frame speed to rates as fast as 1/8000 second, for example. However, the FPA 54 preferably responds to ASA film settings so as to provide imagery similar to the desired ASA film and so that users are familiar with commonly-used settings on the camera. The DCB 50 can also operate as a single speed system, e.g., ASA 400, wherein it automatically adjusts its integration time, gain and other factors to meet the ASA regardless shutter speed and f-stop.

The invention can also function, for example, as 1600 ASA-equivalent film speeds by improving coupling and throughput of the taper and/or increasing FPA sensitivity. The DCB of this embodiment can thus serve applications involving low light illumination.

Figure 2B:
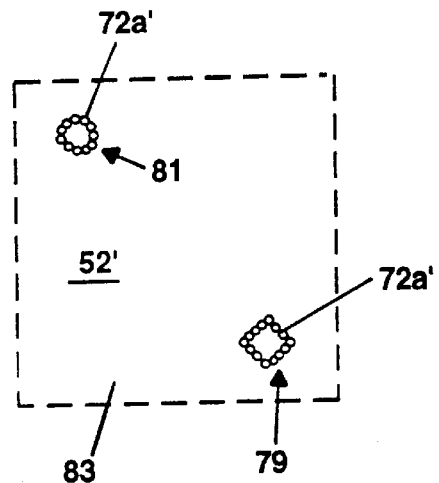
FIG. 2B illustrates various fiber packing configurations which beneficially alter image transmission to the FPA, in accord with the invention.

FIG. 2B illustrates various fiber arrangements suitable with the invention. Specifically, the arrangement of the fibers 72*a'* within the taper 52 can be made to enhance features such as optical MTF and fixed pattern noise by placing fibers in various positions (and/or in conjunction with coatings 75). By way of example, two fiber patterns 79 and 81 are shown in the fiber face 83 of FIG. 2B.

Figure 2C:
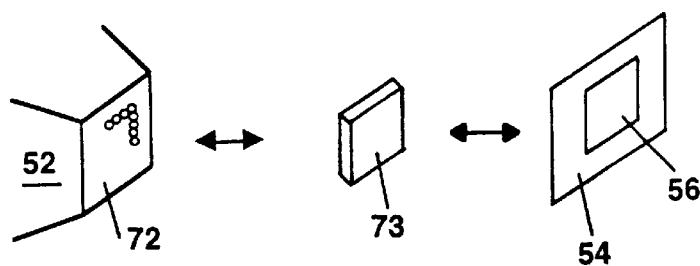
FIG. 2C shows a schematic perspective view of a filter placed between the fiber optic taper and the FPA, in accord with the invention.

FIG. 2C illustrates the addition of a quartz filter 73 disposed adjacent to the surface 72 of the fiber optic 52. The filter 73 is thus disposed between the fiber optic 52 and the FPA 54. Quartz is birefringent; and thus is used in this embodiment to reduce aliasing of data through the FPA 54. The filter 73 can also be coated to correct optical color or other artifacts. The filter can also include optical correction such as to flatten the optical field, for example. Those skilled in the art should appreciate that the filter 73 can alternatively be placed at other locations, such as at the input to the optical taper. The filter 73 can also be constructed as a low pass filter.

Figure 3:
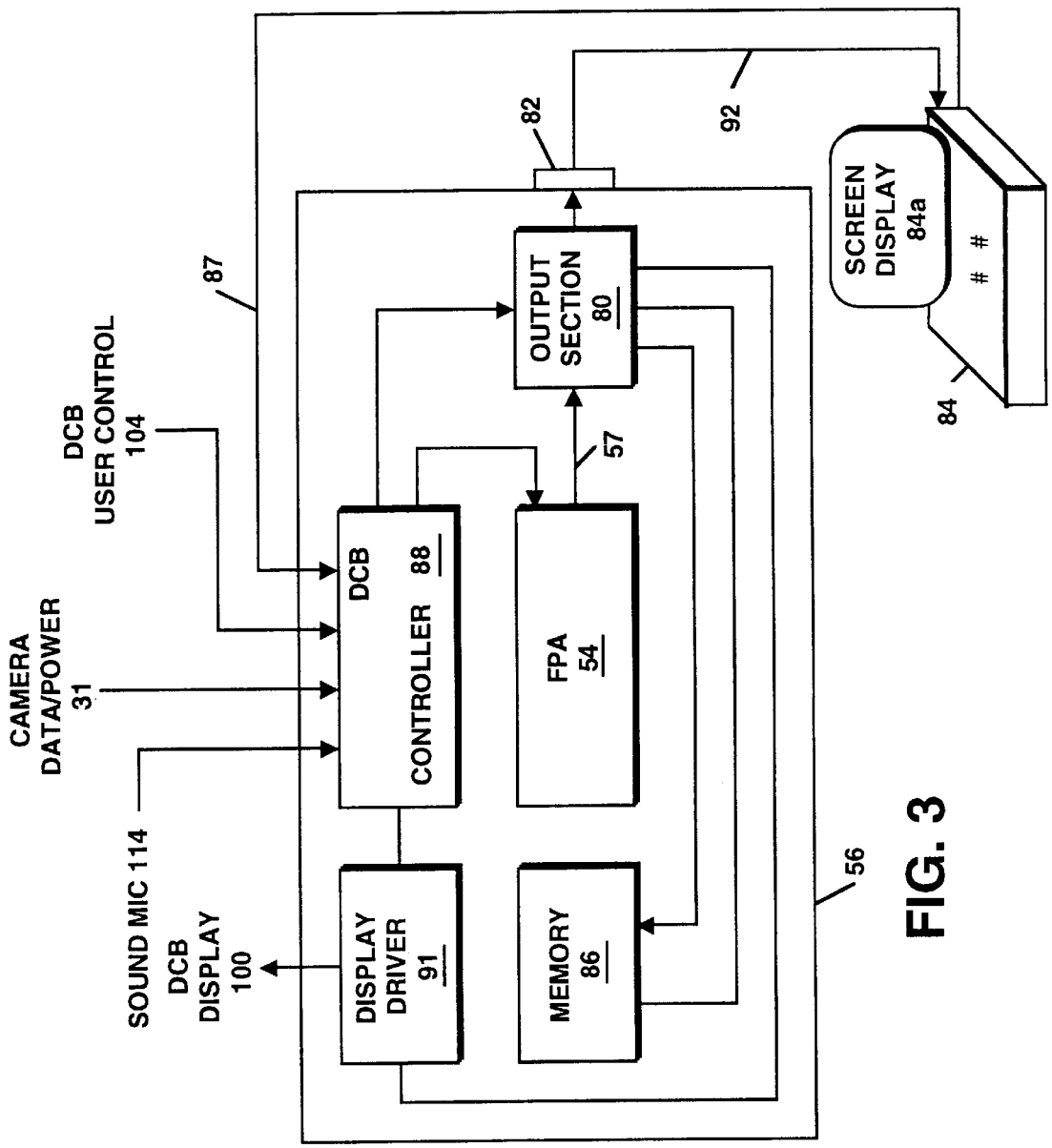
FIG. 3 shows a schematic block diagram of a DCB electronics subsystem constructed according to the invention.

The electronics subsystem and FPA electronics 56, 54 are shown as a functional block diagram in FIG. 3. The subsystem 56 collects the signals 57 from the FPA detectors and processes them into a usable format. By way of example, the electronics subsystem 56 preferably includes an output section 80 that converts focal plane signals into RS170 video or RS232 data streams, such as known to those skilled in the art. A connector 82 (e.g., a SCSI or PCMCIA port) provides for connection to other devices, e.g., a computer 84, so that DCB data 92 can be removed from the DCB 50 and viewed externally.

Alternatively, the subsystem 56 includes solid state memory 86 which stores frames of image data for subsequent downloading from the DCB 50. Specifically, image data collected by the DCB 50 can be stored so that the DCB 50 is portable and untethered to a device such as the computer 84.

Preferably, the DCB 50 operates as a tethered or untethered device by user selection through the DCB controller 88. As such, user commands to either mode can be initiated from a computer 84 or from camera or DCB buttons 28, 30, 102, depending upon programming (e.g., those skilled in the art should appreciate that different commands to the DCB 50 can occur through the simultaneous activation of two or more buttons/switches, or through prolonged activation of a single button, or both).

However, the DCB 50 can also be tethered to the computer 84 for convenient and real time processing of image data that is collected by the DCB 50. The computer 84 collects data 92 through the connector 82 and through a communication line such as a video cable or digital wiring for display on a normal screen display 84*a*.

The subsystem 56 also receives command signals 87 from the computer 84 through interface with the DCB controller 88 (i.e., a microprocessor, microcontroller or DSP), which has main overall control of the electronics subsystem 56, and hence the DCB 50. The controller 88 receives signals 87 from the computer 84 and executes internal commands such as retrieving image frames from memory 86 (e.g., DRAM) and sending those frames to the computer 84. The controller 88 also interfaces with camera data signals 31 generated by user-operated controls and settings such as provided by buttons 28, 30. As such, the subsystem 56 includes data connectivity with signals from the camera 10 or with the interface 18a of FIG. 1A, such as shutter open commands and ASA and f-stop settings. These settings and controls are managed by the controller 88 so that the subsystem 56 operates in a manner consistent with user commands.

Figure 4:
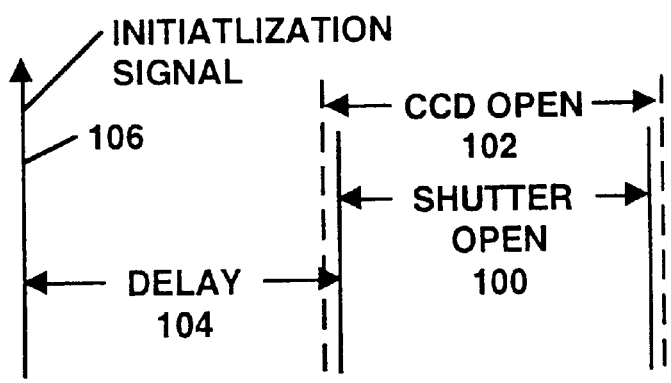
FIG. 4 illustrates timing signals between electronic shuttering and mechanical shuttering, in accord with the invention.

Preferably, the subsystem 56 receives an initialization signal from a user-initiated switch or button 28, FIG. 1. Typically, this signal is a TTL pulse of about 5 V; and the signal is used to initiate the FPA framing capture at a preset delay after receipt of the TTL pulse. Because there is some time to actually initiate a "frame open" command at the FPA 54 (a delay of about 16ms is typical), the timing of all factors such as shutter open/close should be synchronized to acquire the appropriate picture. Accordingly, the delay between a user initiated signal on button 28 (i.e., indicative of the user's action to take a picture) and shutter open (a delay which is measured or known for a camera 10, FIG. 1) is preferably the same as the integration period of the FPA 54, as illustrated in FIG. 4.

The subsystem 56 can also include embedded software and/or real-time processing software to provide "print-ready" digital images. Such software can be included for example within the controller 88 or within the output section 80. These print ready images thus support immediate hard copy printout of "what you see is what you get" (i.e., WYSIWYG) images, known in the art FIG. 4 illustrates that the shutter open interval 100 is ideally the same (or similar to) as the frame integration time 102 of the FPA 54. Each also occur substantially simultaneously after a delay 104 from the initialization signal 106. However, these timings are not required; and can be set according to user preferences. For example, those skilled in the art should appreciate that the FPA 54 can also be electronically shuttered; though for most applications, the normal shutter 24 will be used with the FPA 54.

Typical peak frame rates of the FPA 54 are about 8 frames/second. Accordingly, a delay of about three frames can be incurred after an initialization signal 106. As such, the FPA in certain embodiments functions at about 4 frames/second, effectively.

The subsystem 56 and FPA 54 are preferably powered by the standard battery 27 within the camera body 26. However, those skilled in the art should appreciate that a separate battery and alternative external power connections can power the subsystem 56 and FPA 54.

With further reference to FIG. 2, a user of the DCB 50 can view images immediately through the DCB display 100. The display driver 91 receives commands from the DCB controller 88, through the output section 80, and generates an image on the display 100.

Those skilled in the art should appreciate that the item 100 can also represent an interface to a portable display (such as the user's computer) which obviates the need for a full display.

A user thus commands the display of selected images on the display by a user-initiated control such as through buttons 28, 30. Alternatively, the DCB 50 can include one or more command buttons, controls or switches, illustratively shown as button 102, which generate command signals 104 to the subsystem 56 (and particularly to the controller 88).

Figure 5:
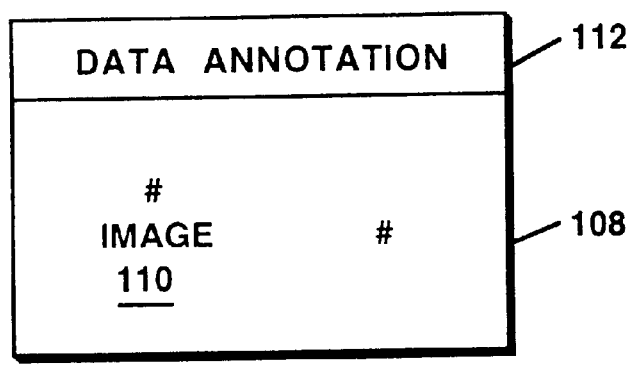
FIG. 5 illustrates a frame of image data from a DCB, including space utilized for annotation.

FIG. 5 shows a representative image frame 108 of data from a DCB 50. In one embodiment, the FPA 54 only requires about 90% of its active pixels to record a 4:3 image 110; and so the remaining portion 112 of the frame 108 can be used for data annotation such as through the computer 84 of FIG. 3. Those skilled in the art should appreciate that other information (e.g., graphics and advertisements) can also be inserted and stored into the frame 108 in the data annotation portion 112. The data annotation 112 can further include voice recording via a microphone 114 attached with the DCB 50 (see FIG. 2). In such an embodiment, voice recognition software is also loaded into the DCB controller 88, such as known in the art. A/D capability can also be placed at the DCB controller interface, if desired, to simplify analog voice capture recognition.

Figure 6:
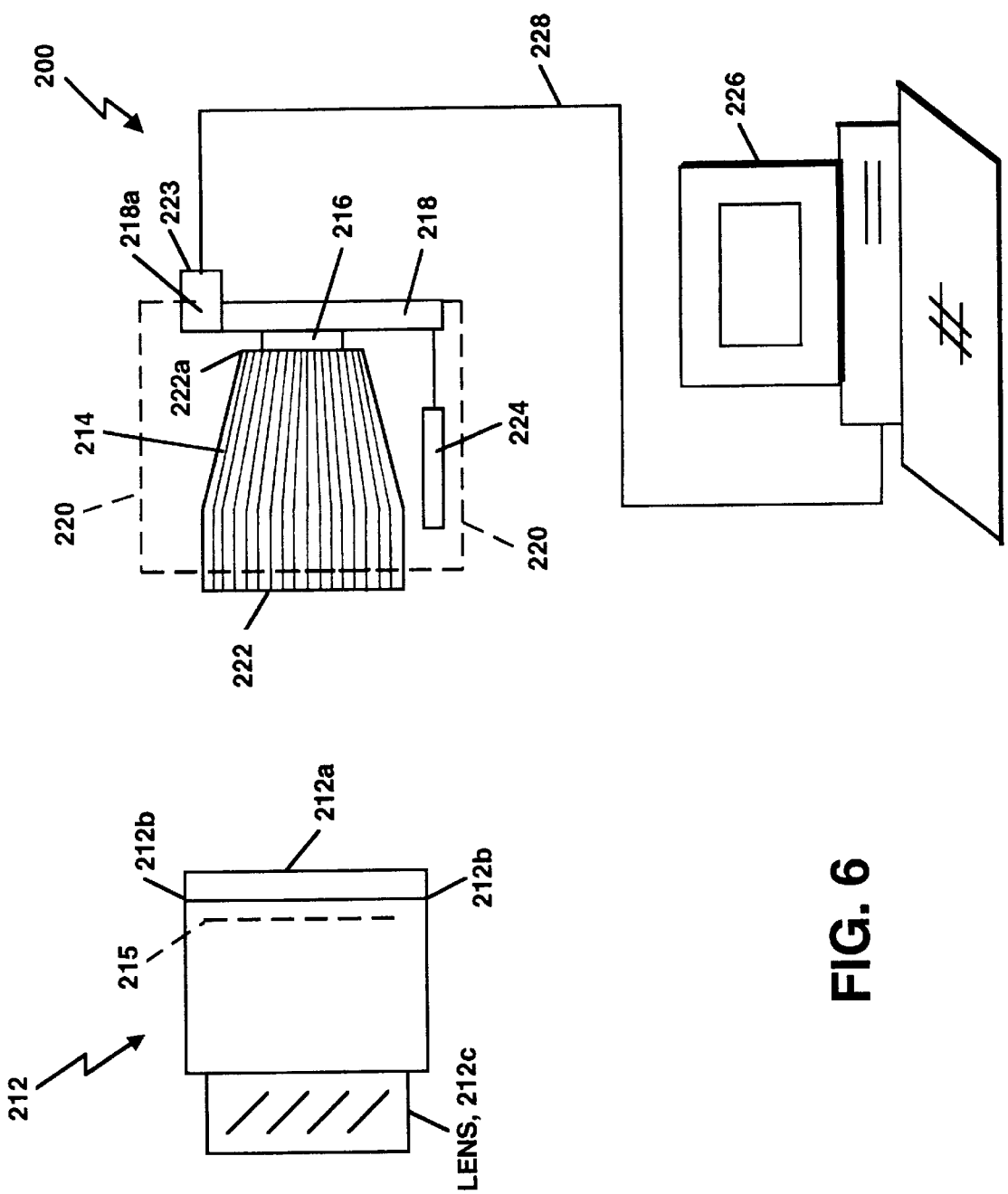
FIG. 6 illustrates a cross-sectional view of one digital camera back constructed according to the invention.

FIG. 6 shows a Digital Camera Back 200 that operates as an accessory to a standard, film-formatted camera 212. In particular, the DCB 200 is made to replace the standard back 212a of the camera 212 at the normal connections 212b of the camera 212 so that a user can attach either back 200, 212a to and from the camera 212 selectively.

The DCB 200 further includes a fiber optic taper 214, a digital focal plane 216 (such as the focal plane used in Polaroid's PDC2000®), an electronics card 218, and a housing 220. Briefly, once the DCB 200 is attached to the camera 212, the front face 222 of the optic taper 214 collects the image at the normal film plane 215 of the camera 212 and relays that image through the fiber taper 214 to the focal plane 216. The focal plane 216 is preferably coupled to a second face 222a of the taper by way of an optical adhesive.

The electronics 218 collects the signals from the focal plane detector elements and processes them into a usable format. By way of example, the electronics 218 preferably includes an output section 218a that converts focal plane signals into RS170 video or RS232 data streams, such as known to those skilled in the art A connector 223 provides for connection to other devices, e.g., a computer 226, so that data can be removed and read from the DCB 200. Alternatively, the DCB 200 includes solid state memory 224 which stores frames of image data for subsequent downloading from the DCB 200.

The DCB 200 can also be tethered to the computer 226 for convenient and real time processing of image data collected by the DCB 200. The computer 226 collects this data through the port 223, such as known to those skilled in the art, and through communication line 228, such as a video cable or digital wiring.

Figure 7:
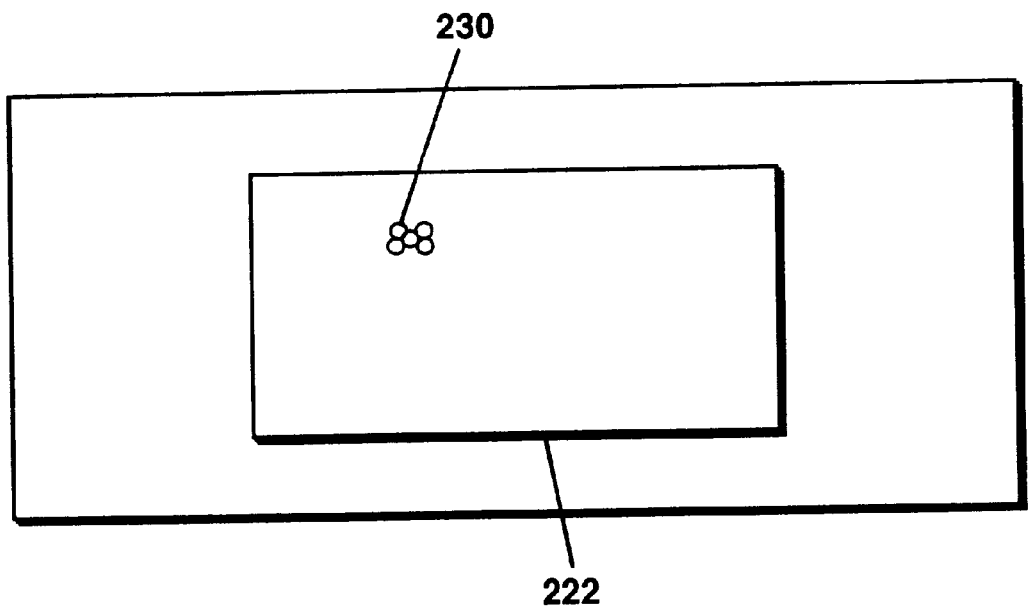
FIG. 7 shows a front view of the digital camera back of FIG. 6.
Figure 8:
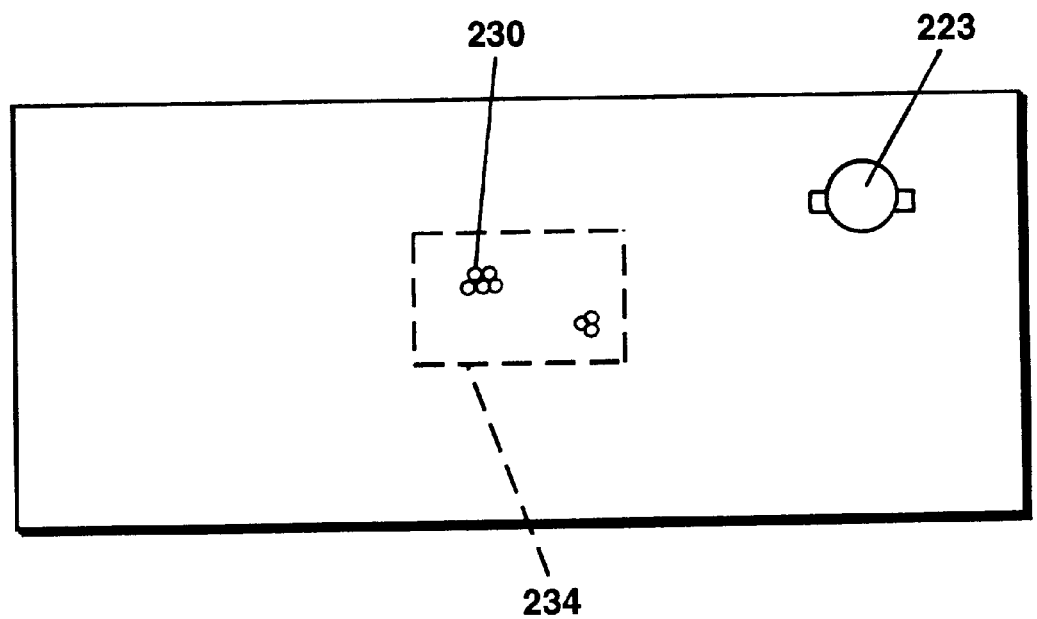
FIG. 8 illustrates a cut-away back view of the digital camera back of FIG. 6

FIG. 7 shows a front view of the DCB 200 of FIG. 6; and FIG. 8 shows a back view of the DCB 200 of FIG. 6. Several of the individual fibers 230 of the taper 214 are illustratively shown. In FIG. 8, the outline 234 of the back face 222a of the taper 214 is shown along with several fibers 230, for purposes of illustration.

Figure 9:
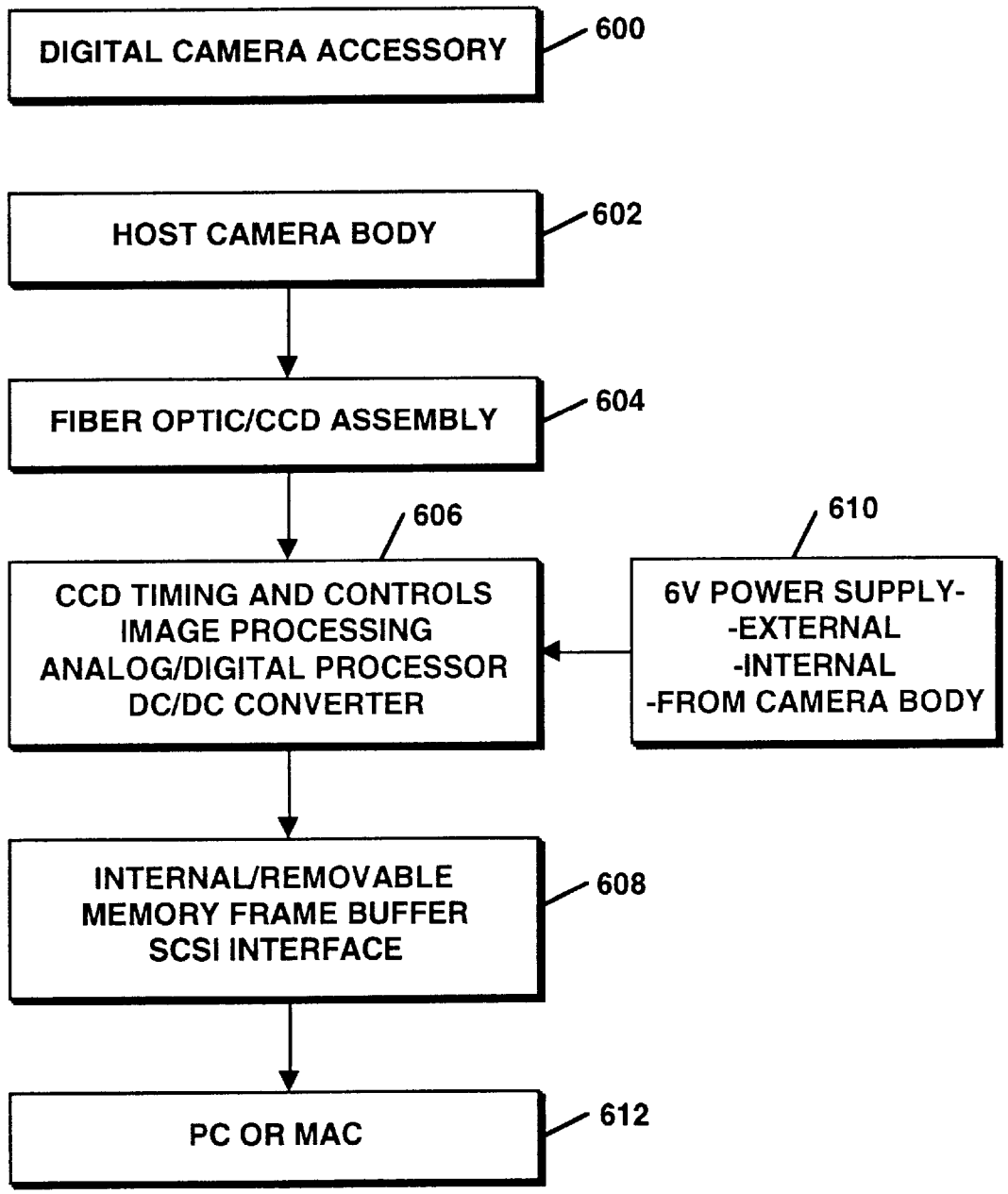
FIG. 9 illustrates a top level assembly and feature segments of a DCB of the invention.

FIG. 9 illustrates mechanical and electrical data construction of one DCB 600 of the invention. The host body 602 of the camera is first integrated with the fiber optic/CCD assembly 604, as discussed above. CCD timing and controls, image processing. A/D processing and conversions 606 are initiated and connected to removable memory, frame buffers, and, e.g., SCSI interfaces 608. External power 610 such as through 6 V supplies connect to power the DCB 600. The DCB 600 is then connected, if desired, to a PC or MAC 612 for use.

The invention thus attains the objects set forth above, among those apparent from preceding description. Since certain changes may be made in the above apparatus and methods without departing from the scope of the invention, it is intended that all matter contained in the above description or shown in the accompanying drawing be interpreted as illustrative and not in a limiting sense.

It is also to be understood that the following claims are to cover all generic and specific features of the invention described herein, and all statements of the scope of the invention which, as a matter of language, might be said to fall there between.

What is claimed:

1. A digital camera back accessory for use with a film-formatted camera, the camera being of the type that includes a camera body and a film image plane, comprising:

a solid state digital image plane array mounted within the camera hack accessory for collecting optical radiation and for converting the radiation to digital signals representative of an image;

a fiber optic that is also mounted within the digital camera hack accessory and has a first fiber array surface arranged the film image plane, and a second fiber array surface arranged at the digital image plane, the fiber optic coupling optical radiation to provide magnification and/or demagnification between the film image plane and the digital image plane; and means coupling the fiber optic to the camera body such that an image at the film image plane is transferred and collected as a digital image at the digital image plane.

2. An accessory of claim 1, further comprising means for coupling the digital image plane to a computer so that camera images are collectable by the computer.

3. An accessory according to claim 1, further comprising solid state memory for storing frames of digital image data.

4. An accessory according to claim 1, further comprising means for attaching and alternatively removing the accessory from the camera.

5. An accessory according to claim 1 wherein the fiber optic is tapered.

6. An accessory according to claim 2, further comprising a personal computer (PC) interface for connecting to a personal computer.

7. An accessory according to claim 1 further comprising an electronics subsystem for data and power control of the accessory.

8. An accessory according to claim 1, further comprising means connecting the accessory to preexisting data paths in the camera, wherein the accessory operates in response to user function at the camera.

9. An accessory according to claim 1, further comprising means for installing and alternatively replacing the accessory with one of (a) a film-based camera back; and (b) an instant-film camera back.

10. An accessory according to claim 1, wherein the taper comprises means for increasing an effective film speed of the camera back accessory.

11. An accessory according to claim 5, wherein the taper comprises optical fibers having a 1:1 magnification.

12. An accessory according to claim 1, wherein the taper is constructed and arranged from material that is transmissive to visible light.

13. An accessory according to claim 1, further comprising means for tethering the accessory to a computer, wherein a user gains control and access to image acquisition from the accessory, including image download and display on the computer.

14. An accessory according to claim 1, further comprising electronics for selecting an image acquisition area on the focal plane, a remaining portion of the focal plane being useable for selective user annotation.

15. An accessory according to claim 1, further comprising means for acquiring between one and eight frames per second of image data.

16. An accessory according to claim 1, further comprising a display coupled to the focal plane for displaying the digital image to a user of the accessory.

17. An accessory according to claim 1, further comprising an electronics subsystem having a microphone and voice recognition software for collecting user spoken annotations for alphanumeric annotation into a digital image frame.

18. An accessory according to claim 1, further comprising an electronics subsystem for controlling the digital image plane and for collecting and processing digital image data.

19. An accessory according to claim 18, wherein the subsystem comprises means responsive to user-initiated commands at the camera.

20. An accessory according to claim 18, wherein the subsystem comprises an output section for formatting digital images into standard data communications format.

21. An accessory according to claim 20, wherein the subsystem comprises a display driver and connection for display, the driver being responsive to the output section to generate display data at the connections, wherein a display coupled to the connections can view one or more digital images.

22. An accessory according to claim 1, further comprising slaving electronics coupling the accessory to data within the camera, the slaving electronics thus providing control of the accessory through the camera.

23. An accessory according to claim 22, wherein the slaving electronics comprising means for controlling the accessory through user-initiated commands on the camera.

24. An accessory according to claim 22, wherein the slaving electronics comprises means for synchronizing focal plane actions to a shutter within the camera.

25. An accessory according to claim 22, wherein the slaving electronics comprises means for synchronizing focal plane actions to triggering from the camera.

26. An accessory according to claim 1, further comprising means for synchronizing the accessory to triggers initiated at the camera.

27. An accessory according to claim 1, further comprising means for synchronizing the accessory to a flash trigger.

28. An accessory according to claim 1, further comprising power slave electronics coupling the accessory to power within the camera, the power slave electronics thus providing power for the accessory through the camera.

29. An accessory according to claim 1, further comprising means for providing print-ready WYSIWYG images.

30. An accessory according to claim 29, wherein said means for providing comprises one or more of embedded software and real-time image processing software.

31. A method of integrating a digital camera back to a camera of the type that includes a camera body and a film image plane, the camera back having a back door, a solid state digital image plane for collecting optical radiation and for converting the radiation to digital signals representative of an image and a fiber optic taper that has a first fiber array surface arranged at the camera film plane, and a second fiber array surface arranged at the digital image plane, the fiber optic taper being tapered so as to provide magnification and/or demagnification between the film plane and the digital image plane, an image at the film image plane being transferred and collected as a digital image at the digital image plane, comprising the steps of:

coupling a compliant plate to the door, the compliant plate being aligned with film rails in the camera; and coupling the fiber optic taper through a hole in the door and to the compliant plate, wherein the taper moveably adjusts as the door is closed to the camera such that the first fiber array surface aligns with the film image plane at closure.

32. A method according to claim 31, wherein the step of coupling comprises coupling a spring-loaded plate.

* * * * *

UNITED STATES PATENT AND TRADEMARK OFFICE
CERTIFICATE OF CORRECTION

PATENT NO. : 6,115,556
DATED : September 5, 2000
INVENTOR(S) : Terrence P. Reddington It is certified that error appears in the above-identified patent and that said Letters Patent is hereby corrected as shown below:

Claim 1, Column 17,
Line 11 reads: "camera hack accessory" It should read: --camera back accessory--
Line 15 reads: "hack accessory" It should read: --back accessory--
Line 16 reads: "arrange the film" It should read: --arrange at the film--

Claim 24, Column 18,
Line 29 reads: "plane actions" It should read: --plane array actions--

Claim 25, Column 18,
Line 32 reads: "plane actions" It should read: --plane array actions--

Signed and Sealed this

Third Day of July, 2001

*Attest:*

NICHOLAS P. GODICI
*Attesting Officer*     *Acting Director of the United States Patent and Trademark Office*